United States Patent
Shemesh et al.

(10) Patent No.: US 11,616,806 B1
(45) Date of Patent: Mar. 28, 2023

(54) METHODS FOR PROTECTING WEB BASED RESOURCES FROM D/DOS ATTACKS AND DEVICES THEREOF

(71) Applicant: F5 Networks, Inc., Seattle, WA (US)

(72) Inventors: Yaniv Shemesh, Sammanish, WA (US); David Stav, Mountain View, CA (US)

(73) Assignee: F5, Inc., Seattle, WA (US)

( * ) Notice: Subject to any disclaimer, the term of this patent is extended or adjusted under 35 U.S.C. 154(b) by 315 days.

(21) Appl. No.: 15/149,981

(22) Filed: May 9, 2016

Related U.S. Application Data

(60) Provisional application No. 62/158,945, filed on May 8, 2015.

(51) Int. Cl.
H04L 9/40 (2022.01)

(52) U.S. Cl.
CPC ...... H04L 63/1458 (2013.01); H04L 63/1416 (2013.01)

(58) Field of Classification Search
None
See application file for complete search history.

(56) References Cited

U.S. PATENT DOCUMENTS

| | | |
|---|---|---|
| 4,783,828 A | 11/1988 | Sadjadi et al. |
| 5,537,488 A | 7/1996 | Menon et al. |
| 6,118,893 A | 9/2000 | Li |
| 6,748,056 B1 | 6/2004 | Capriotti et al. |
| 6,769,066 B1 | 7/2004 | Botros et al. |
| 7,228,412 B2 | 6/2007 | Freed |
| 7,406,606 B2 | 7/2008 | Chawla et al. |
| 7,441,429 B1 | 10/2008 | Nucci et al. |
| 7,519,834 B1 | 4/2009 | Dondeti et al. |
| 7,624,447 B1 | 11/2009 | Horowitz et al. |
| 7,743,415 B2 | 6/2010 | Poletto et al. |
| 8,572,733 B1 | 10/2013 | Rockwood |
| 8,886,620 B1 * | 11/2014 | Mukerji ............... G06F 16/954 707/705 |
| 8,943,588 B1 | 1/2015 | Speegle |
| 9,077,709 B1 | 7/2015 | Dall |
| 9,578,055 B1 * | 2/2017 | Khanal ............... H04L 63/1458 |

(Continued)

OTHER PUBLICATIONS

BIG-IP® Analytics: Implementations, version 11.3, Nov. 15, 2012, F5 Networks, Inc., pp. 1-40.

(Continued)

*Primary Examiner* — Fatoumata Traore

(57) ABSTRACT

A method, non-transitory computer readable medium and device that assists with preventing distributed denial of service attack includes receiving a request for a web resource from a client computing device. The received requested for the web resource is determined for presence of referrer header information. When the received request is determined to include the referrer header information, then the referrer header information is checked whether it includes a known domain and a valid cookie associated with the known domain. A distributed denial of service attack is prevented by providing a proactive challenge to the requesting client computing device when received request for the web resource does not include the referrer header information or when the referrer header information comprises the known domain and does not include the valid cookie.

15 Claims, 5 Drawing Sheets

(56) References Cited

U.S. PATENT DOCUMENTS

| | | | |
|---|---|---|---|
| 9,628,499 | B1 | 4/2017 | Yu et al. |
| 9,654,485 | B1 | 5/2017 | Neumann |
| 9,900,344 | B2 | 2/2018 | Smith et al. |
| 9,967,250 | B2 | 5/2018 | Johansson et al. |
| 10,237,298 | B1 | 3/2019 | Nguyen |
| 2002/0116615 | A1 | 8/2002 | Nguyen et al. |
| 2003/0042439 | A1 | 3/2003 | Rusu et al. |
| 2003/0073091 | A1 | 4/2003 | Krylov et al. |
| 2003/0145232 | A1 | 7/2003 | Poletto et al. |
| 2003/0199762 | A1 | 10/2003 | Fritz et al. |
| 2004/0037326 | A1 | 2/2004 | D'souza et al. |
| 2004/0103283 | A1 | 5/2004 | Hornak |
| 2004/0170123 | A1 | 9/2004 | Carpenter et al. |
| 2005/0027846 | A1 | 2/2005 | Wolfe et al. |
| 2005/0111367 | A1 | 5/2005 | Jonathan Chao et al. |
| 2005/0195840 | A1 | 9/2005 | Krapp et al. |
| 2005/0198519 | A1 | 9/2005 | Tamura et al. |
| 2006/0031483 | A1 | 2/2006 | Lund et al. |
| 2006/0031928 | A1 | 2/2006 | Conley et al. |
| 2007/0014276 | A1 | 1/2007 | Bettink |
| 2007/0118894 | A1 | 5/2007 | Bhatia |
| 2007/0280114 | A1 | 12/2007 | Chao et al. |
| 2007/0294187 | A1 | 12/2007 | Scherrer |
| 2008/0028467 | A1 | 1/2008 | Kommareddy et al. |
| 2008/0263215 | A1 | 10/2008 | Schnellbaecher |
| 2008/0320567 | A1* | 12/2008 | Shulman ............ H04L 63/1416 726/4 |
| 2009/0199297 | A1 | 8/2009 | Jarrett et al. |
| 2010/0031315 | A1 | 2/2010 | Feng et al. |
| 2010/0070451 | A1 | 3/2010 | Hugues |
| 2010/0284282 | A1 | 11/2010 | Golic |
| 2010/0325418 | A1 | 12/2010 | Kanekar |
| 2011/0012586 | A1 | 1/2011 | Montanar et al. |
| 2011/0072516 | A1* | 3/2011 | Cohen ................... G06F 21/552 726/22 |
| 2011/0154026 | A1 | 6/2011 | Edstrom |
| 2011/0264905 | A1 | 10/2011 | Ovsiannikov |
| 2012/0079592 | A1 | 3/2012 | Pandrangi et al. |
| 2012/0117239 | A1* | 5/2012 | Holloway ........... H04L 61/1511 709/226 |
| 2012/0144487 | A1 | 6/2012 | Kim et al. |
| 2012/0167210 | A1 | 6/2012 | Oro et al. |
| 2012/0173710 | A1 | 7/2012 | Rodriguez et al. |
| 2012/0323700 | A1* | 12/2012 | Aleksandrovich ...... G06F 21/36 705/14.69 |
| 2013/0080407 | A1 | 3/2013 | Levow |
| 2013/0276114 | A1 | 10/2013 | Friedrichs et al. |
| 2014/0095865 | A1 | 4/2014 | Yerra |
| 2014/0289854 | A1 | 9/2014 | Mahvi |
| 2014/0298419 | A1 | 10/2014 | Boubez |
| 2014/0317739 | A1* | 10/2014 | Be'ery ................... H04L 63/14 726/23 |
| 2015/0067328 | A1 | 3/2015 | Yin |
| 2015/0088662 | A1 | 3/2015 | Noller et al. |
| 2015/0163234 | A1 | 6/2015 | Tal et al. |
| 2015/0310196 | A1 | 6/2015 | Turgeman et al. |
| 2015/0215334 | A1 | 7/2015 | Bingham et al. |
| 2015/0271179 | A1 | 9/2015 | Wang et al. |
| 2015/0295945 | A1 | 10/2015 | Canzanese et al. |
| 2016/0021117 | A1 | 1/2016 | Harmon et al. |
| 2016/0127406 | A1 | 5/2016 | Smith et al. |
| 2016/0182542 | A1 | 6/2016 | Iford |
| 2017/0171231 | A1 | 6/2017 | Reybok, Jr. et al. |
| 2017/0249306 | A1 | 8/2017 | Allen et al. |
| 2017/0318053 | A1 | 11/2017 | Singh et al. |
| 2018/0124300 | A1 | 5/2018 | Brook |

OTHER PUBLICATIONS

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", p. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

F5 Networks, Inc., "BIG-IP® Application Security Manager m: Implementations", Manual, Nov. 10, 2017, pp. 1-348, version 13.0, F5 Networks, Inc.

* cited by examiner

METHODS FOR PROTECTING WEB BASED RESOURCES FROM D/DOS ATTACKS AND DEVICES THEREOF

This application claims the benefit of U.S. Provisional Patent Application Ser. No. 62/158,945, filed May 8, 2015, which is hereby incorporated by reference in its entirety.

FIELD

This technology generally relates to methods and devices for network traffic management and, more particularly, to methods for protecting web based resources from distributed denial of service attacks and devices thereof.

BACKGROUND

Web applications provide end users with client access to server functionality through a set of Web pages. These pages often contain JavaScript code to be executed dynamically within the client web browser. However, Web applications, such as web browsers, are subject to attacks, such as cross-site scripting, or cookie theft, among many others.

Of the current attacks on web applications, script injection based attacks are by far the most common. Script injection vulnerability may be present whenever a web application includes data of uncertain origin. In a typical attack, malicious data with surreptitiously embedded scripts is included in requests to a benign web application server. Later, the server may include that data and scripts in web pages it returns to unsuspecting users. Since web browsers execute scripts on a page with web application, these returned scripts can give attackers control over the user's web application activities and/or client devices and initiate distributed denial of service attacks on the web servers.

SUMMARY

A method for preventing distributed denial of service attack includes receiving by an application manager apparatus a request for a web resource from a client computing device. The received requested for the web resource is determined for presence of referrer header information by the application manager apparatus. When the received request is determined to include the referrer header information, then the referrer header information is checked whether it includes a known domain and a valid cookie associated with the known domain by the application manager apparatus. A distributed denial of service attack is prevented by the application manager apparatus by providing a proactive challenge to the requesting client computing device when received request for the web resource does not include the referrer header information or when the referrer header information comprises the known domain and does not include the valid cookie.

A non-transitory computer readable medium having stored thereon instructions for preventing distributed denial of service attack comprising machine executable code which when executed by at least one processor, causes the processor to perform steps includes receiving a request for a web resource from a client computing device. The received requested for the web resource is determined for presence of referrer header information. When the received request is determined to include the referrer header information, then the referrer header information is checked whether it includes a known domain and a valid cookie associated with the known domain. A distributed denial of service attack is prevented by providing a proactive challenge to the requesting client computing device when received request for the web resource does not include the referrer header information or when the referrer header information comprises the known domain and does not include the valid cookie.

An application manager apparatus including one or more processors coupled to a memory and configured to be capable of executing programmed instructions comprising and stored in the memory to receive a request for a web resource from a client computing device. The received requested for the web resource is determined for presence of referrer header information. When the received request is determined to include the referrer header information, then the referrer header information is checked whether it includes a known domain and a valid cookie associated with the known domain. A distributed denial of service attack is prevented by providing a proactive challenge to the requesting client computing device when received request for the web resource does not include the referrer header information or when the referrer header information comprises the known domain and does not include the valid cookie.

This technology provides a number of advantages including providing a method, non-transitory computer readable medium and apparatus that effectively assists with preventing distributed denial of service attack on web resources. Using the technique illustrated below, the technology is able to distinguish between bots and authenticated client devices and so does not provide bots the requested web resources thereby preventing the distributed denial of service attacks on the server.

DETAILED DESCRIPTION

Figure 1:
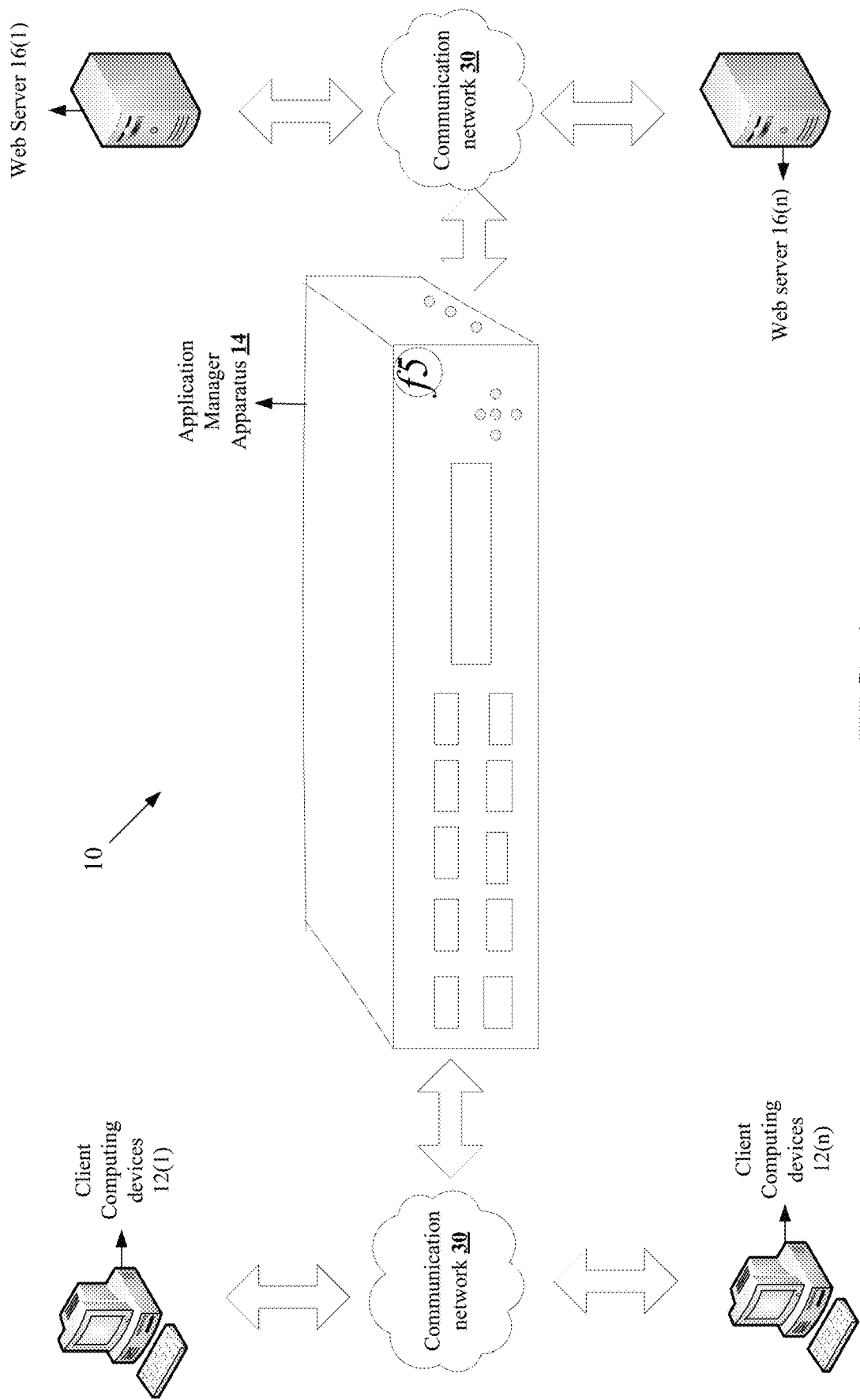
FIG. 1 is an example of a block diagram of an environment including an application manager apparatus for protecting web based resources from D/Dos attacks.
Figure 2:
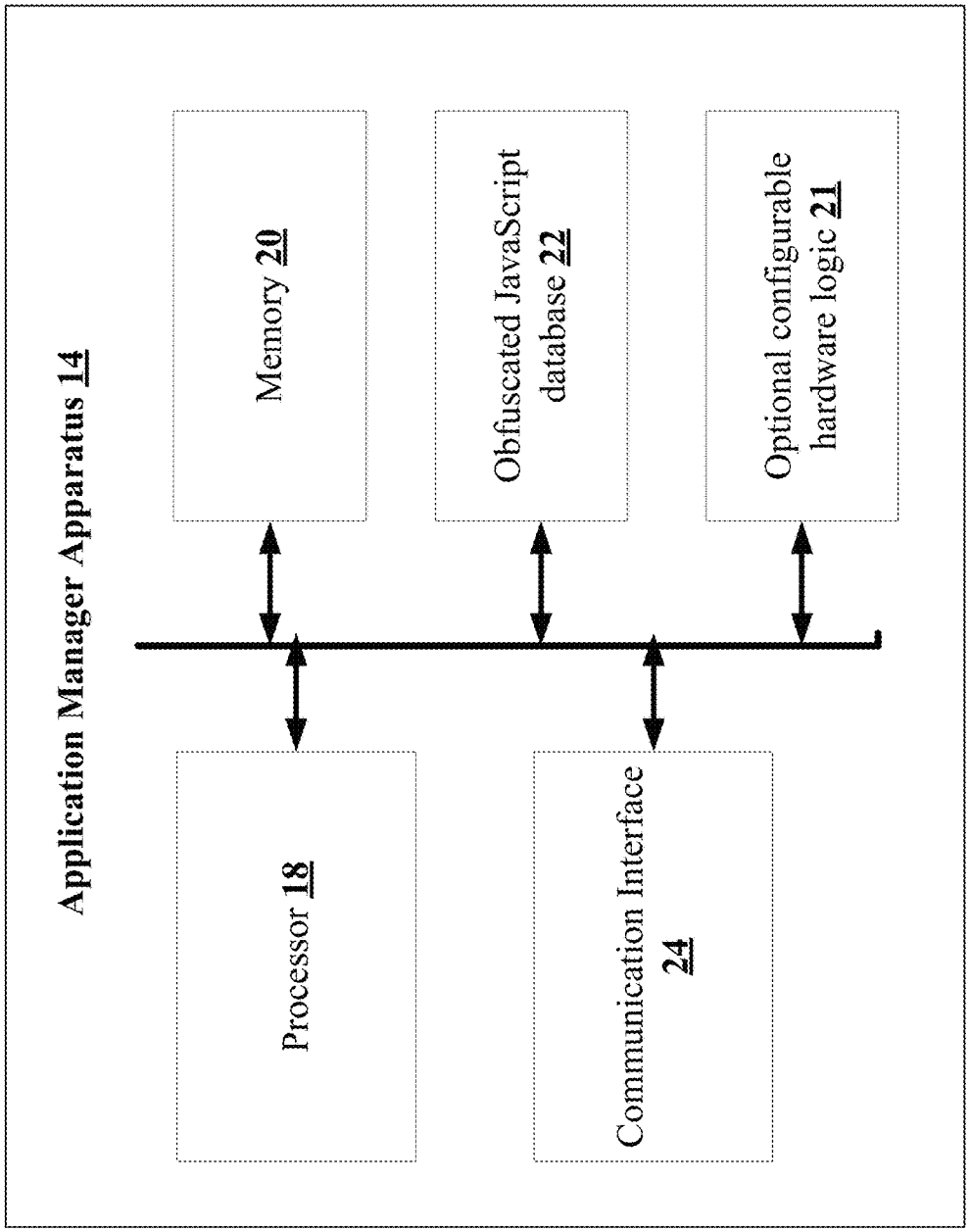
FIG. 2 is an example of a block diagram of the application manager apparatus.

An example of a network environment 10 for protecting web based resources from distributed denial of service (D/DoS) attacks with the application manager apparatus 14 is illustrated in FIGS. 1 and 2. The exemplary environment 10 includes a plurality of client computing devices 12(1)-12(n), an application manager apparatus 14, and a plurality of web servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including protecting web based resources from D/Dos attacks.

Referring more specifically to FIGS. 1 and 2, application manager apparatus 14 is coupled to the plurality of client computing devices 12(1)-12(n) through the communication network 30, although the plurality of client computing devices 12(1)-12(n), and application manager apparatus 14 may be coupled together via other topologies. Additionally, application manager apparatus 14 is coupled to the plurality of web servers 16(1)-16(n) through the communication network 30, although the plurality of web servers 16(1)-16(n) and application manager apparatus 14 may be coupled together via other topologies.

The application manager apparatus 14 assists with protecting web based resources from D/Dos attacks as illustrated and described by way of the examples herein, although application manager apparatus 14 may perform other types and/or numbers of functions. As illustrated in FIG. 2, the application manager apparatus 14 may include a processor or central processing unit (CPU) 18, a memory 20, optional configurable hardware logic 21, obfuscated JavaScript database 22, and a communication system 24 which are coupled together by a bus 26, although the application manager apparatus 14 may comprise other types and numbers of elements in other configurations. In this example, the bus 26 is a PCI Express bus in this example, although other bus types and links may be used.

The processor 18 within the application manager apparatus 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
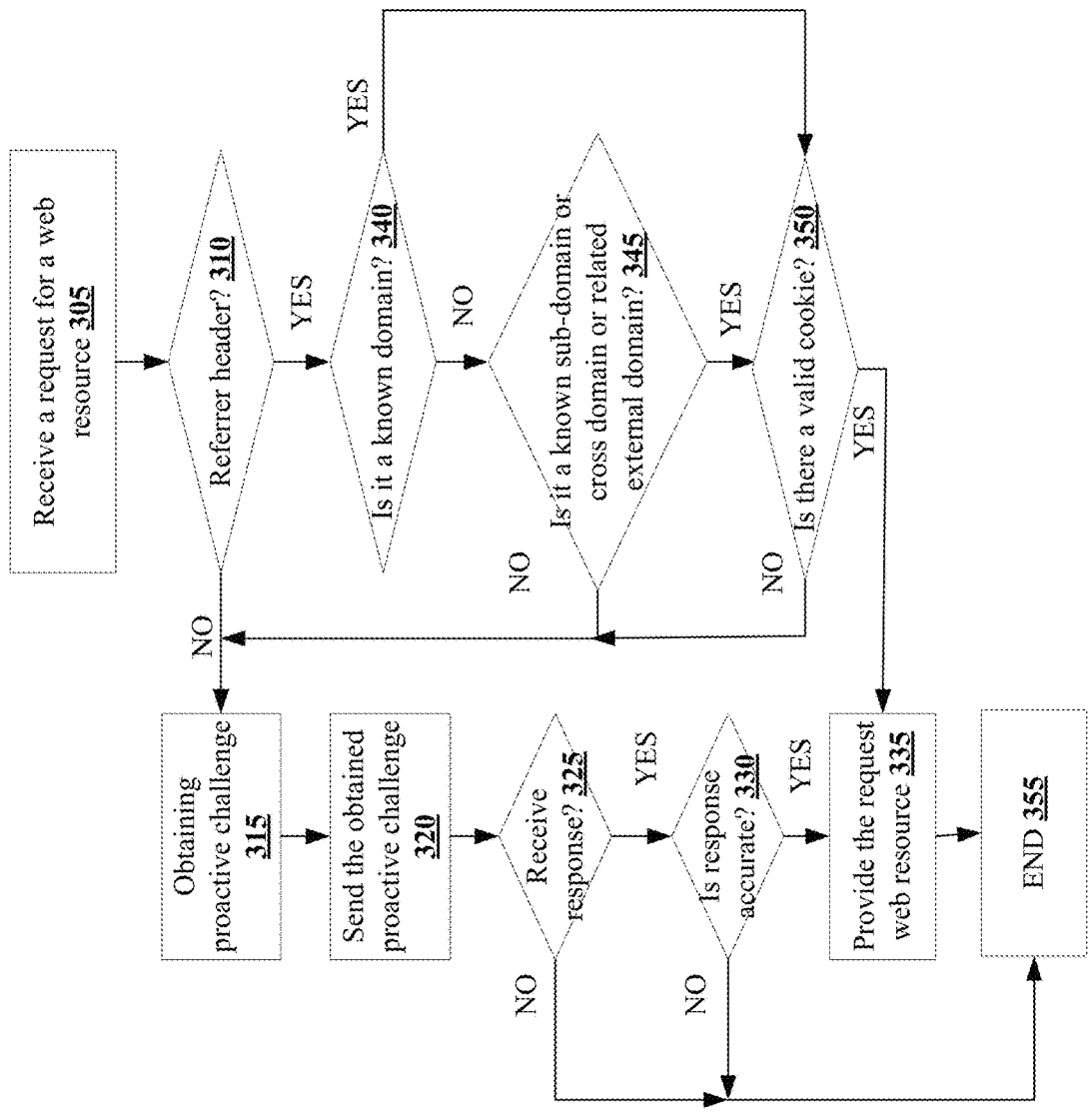
FIG. 3 is an exemplary flowchart of a method for protecting web based resources from D/Dos attacks.

Memory 20 within the application manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in memory 20 that may be executed by the processor 18 and/or may be implemented by configured logic in the optional configurable logic 21.

Figure 4:
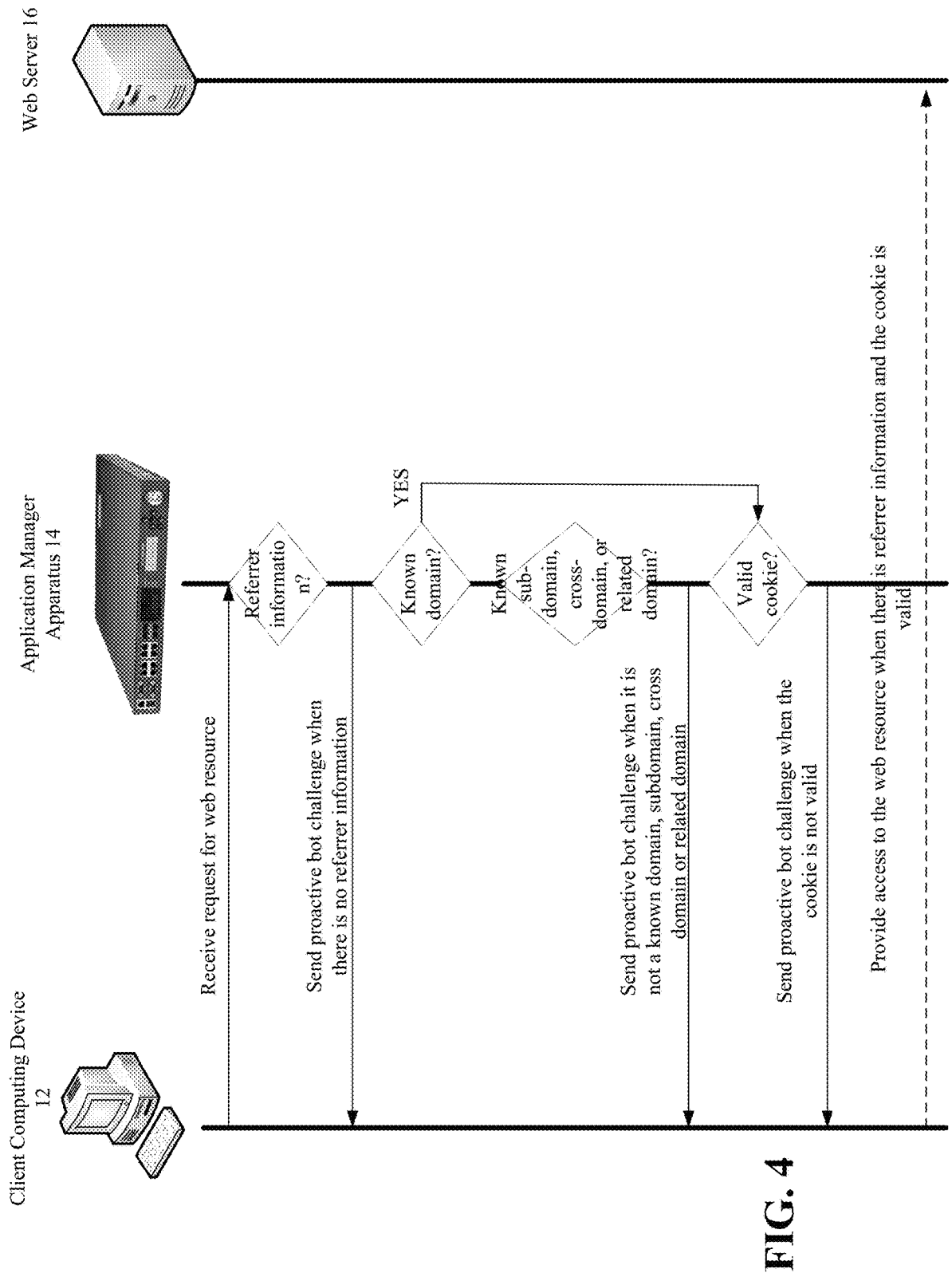
FIG. 4 is an exemplary sequence diagram illustrating the method for protecting web based resources from D/Dos attacks.
Figure 5:
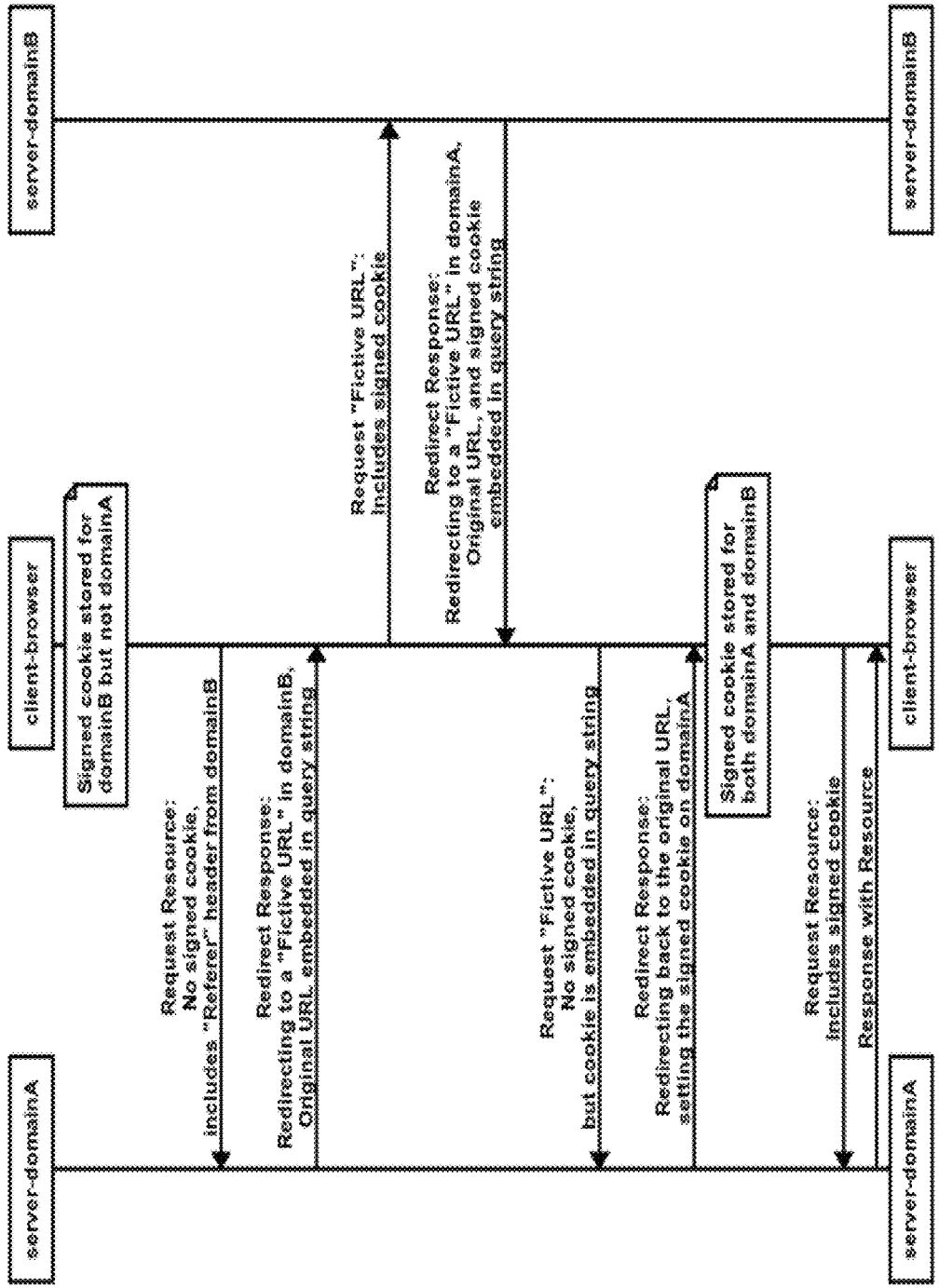
FIG. 5 is an exemplary sequence diagram illustrating the technique for obtaining a cookie from a different domain.

Additionally, the memory of the application manager apparatus 14 can store one or more applications that can include computer executable instructions that, when executed by the application manager apparatus 14, causes the application manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the application manager apparatus 14 itself, may be located in virtual server(s) running in a cloud-based computing environment rather than being tied to one or more specific physical network computing devices. Also, the application(s) may be running in one or more virtual machines (VMs) executing on the application manager apparatus 14. Additionally, in at least one of the various embodiments, virtual machine(s) running on the mobile application manager apparatus 14 may be managed or supervised by a hypervisor.

The optional configurable hardware logic 21 in the application manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the application manager apparatus 14 is used to operatively couple and communicate between the application manager apparatus 14, the plurality of client computing devices 12(1)-12(n), and the plurality of web servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n), include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of web servers 16(1)-16(n) via the application manager apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the application manager apparatus 14 to conduct one or more operations with the plurality of web servers 16(1)-16(n), such as to obtain data from one of the plurality of web servers 16(1)-16(n), by way of example only, although other numbers and/or types of systems could be utilizing these resources and other types and numbers of functions utilizing other types of protocols could be performed.

Each of the plurality of web servers 16(1)-16(n) include a central processing unit (CPU) or processor, a memory, and a communication system, which are coupled together by a bus or other link, although other numbers and/or types of network devices could be used. Generally, the plurality of web servers 16(1)-16(n) process requests for providing access to one or more enterprise web applications received from the plurality of client computing devices 12(1)-12(n), application manager apparatus 14, via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the application manager apparatus 14. The plurality of web servers 16(1)-16(n) may provide data or receive data in response to requests directed toward the respective applications on the plurality of web servers 16(1)-16(n) from the plurality of client computing devices 12(1)-12(n) or the application manager apparatus 14. It is to be understood that the plurality of web servers 16(1)-16(n) may be hardware or software or may represent a system with multiple external resource servers, which may include internal or external networks. In this example the plurality of web servers 16(1)-16(n) may be any version of Microsoft® IIS servers or Apache® servers, although other types of servers may be used.

Although the plurality of web servers 16(1)-16(n) are illustrated as single web application servers, one or more actions of each of the servers 16(1)-16(n) may be distributed across one or more distinct network computing devices. Moreover, the servers 16(1)-16(n) are not limited to a particular configuration. Thus, the plurality servers 16(1)-16(n) may contain a plurality of network computing devices that operate using a master/slave approach, whereby one of the network computing devices of the servers 16(1)-16(n) operate to manage and/or otherwise coordinate operations of the other network computing devices. The plurality of web servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, one or more of the servers 16(1)-16(n) depicted in FIG. 1 can operate within application manager apparatus 14 rather than as a stand-alone server communicating with application manager apparatus 14 via the communication network(s) 30. In this example the servers 16(1)-16(n) operate within the memory of the application manager apparatus 14.

While application manager apparatus 14 is illustrated in this example as including a single device, application manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise application manager apparatus 14 in other examples can be standalone devices or integrated with one or more other devices or applications, such as one of the plurality of web servers 16(1)-16(n) or, the application manager apparatus 14, or applications coupled to the communication network(s), for example. Moreover, one or more of the devices of application manager apparatus 14 in these examples can be in a same or a different communication network 30 including one or more public, private, or cloud networks, for example.

Although an exemplary environment 10 with the plurality of client computing devices 12(1)-12(n), the application manager apparatus 14, and the plurality of web servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network, such as application manager apparatus 14, plurality of client computing devices 12(1)-12(n), or plurality of web servers 16(1)-16(n), for example, may be configured to operate as virtual instances on the same physical machine. In other words, one or more of application manager apparatus 14, plurality of client computing devices 12(1)-12(n), or plurality of web servers 16(1)-16(n) illustrated in FIG. 1 may operate on the same physical device rather than as separate devices communicating through a network as depicted in FIG. 1. There may be more or fewer plurality of client computing devices 12(1)-12(n), application manager apparatus 14, or plurality of web servers 16(1)-16(n) than depicted in FIG. 1. The plurality of client computing devices 12(1)-12(n) or the plurality of web servers 16(1)-16(n) could be implemented as applications on application manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for protecting web based resources from D/Dos attacks will now be described with reference to FIGS. 1-5. The exemplary method begins at step 305 where the application manager apparatus 14 receiving a request for a web resource from one of the plurality of client computing devices 12(1)-12(n), although the application manager apparatus 14 can receive other types or amounts of resources. In this example, web resource relates to an image, although the web resource can relate to other types or amounts of information. Additionally in this example, the application manager apparatus 14 receives the request for an image inside a hypertext markup language (HTML) page or the request for the image can be received as uniform resource locator (URL) link to the image from the web browser executing on the requesting one of the plurality of client computing devices 12(1)-12(n), although the application manager apparatus 14 can receive the request for other types or web resources.

In the next step 310, the application manager apparatus 14 determines when the received request for the web resource includes referrer information in the header of the received request, although the application manager apparatus 14 could be looking for other types and/or amounts of information or other data. By way of example only, the referrer information relates to the URL of the requested image present in the header of the received request, although the referrer information can include other types and/or amounts of information associated with the requested image. Accordingly, when the application manager apparatus 14 determines that the received request does not include the referrer information, then the No branch is taken to step 315.

In next step 315, the application manager apparatus 14 obtains a proactive defense challenge, although the application manager apparatus 14 can obtain other types and/or number of challenges or other tests. By way of example only, the proactive defense challenge can be an obfuscated JavaScript that is obtained from the obfuscated JavaScript database 22, although the proactive defense challenge can include other types and/or numbers of challenges that can be obtained from other locations.

Next in step 320, the application manager apparatus 14 sends the obtained JavaScript challenge to the requesting one of the plurality of client computing devices 12(1)-12(n). By way of example only, the application manager apparatus 14 can inject the obtained obfuscated JavaScript in a URL and send it to the requesting one of the plurality of client computing devices 12(1)-12(n). Alternatively in another example, the application manager apparatus 14 can redirect the web browser executing on the requesting one of the plurality of client computing devices 12(1)-12(n) to a different webpage to respond to the proactive challenge.

Alternatively in another example, the application manager apparatus 14 can also determine whether the obfuscated JavaScript can be injected into the received URL of web resource. When the application manager apparatus 14 determines that the obfuscated JavaScript cannot be injected, the application manager apparatus 14 can proceed to drop the received request for the web resource and end the exemplary method ends at step 355.

In the next step 325, the application manager apparatus 14 determines when a response was received to the proactive challenge that was sent in the previous step 320. By way of example only, the application manager apparatus 14 can wait for a predetermined amount of duration, such as sixty seconds by way of example only, to receive a response from the requesting one of the client computing devices 12(1)-12(n), although the application manager apparatus 14 can wait for any other duration of time. Accordingly, when the application manager apparatus 14 determines that the response to the challenge was not received, then the No branch is taken to end the exemplary method at step 355. By way of example only, the application manager apparatus 14 can receive the response to the proactive challenged from the requesting one of the plurality of client computing devices 12(1)-12(n) when the requesting one of the plurality of client computing devices 12(1)-12(n) executes the obfuscated JavaScript in the web browser, although the application manager apparatus 14 can receive the response based on other types or amounts of operation that can be performed by the web browser of the requesting one of the plurality of client computing devices 12(1)-12(n). In this example, the application manager apparatus 14 determines the requesting one of the plurality of client computing device to be a bot and therefore does not provide the requested web resources from the plurality of servers 16(1)-16(n) thereby preventing the distributed denial of service attacks on the server. However, when the application manager apparatus 14 determines that the response was received, then the Yes branch is taken to step 330.

In the next step 330, the application manager apparatus 14 determines when the received response is accurate. In this example, the application manager apparatus 14 has a stored table of the challenges and the corresponding answers for the challenges. The application manager apparatus 14 compares the received response with the stored answer to determine when the received response is accurate. Accordingly, when the application manager apparatus 14 determines that the received response is not accurate, then the No branch is taken to end the exemplary method at step 355. However, when the application manager apparatus 14 determines that the received response is accurate, then the Yes branch is taken to step 335.

In step 335, the application manager apparatus 14 provides the requested web resource to the requesting one of the plurality of client computing devices 12(1)-12(n) and the exemplary method ends at step 355.

However, back in step 310, when the application manager apparatus 14 determines that the received request includes the referrer information, then the Yes branch is taken to step 340.

In step 340, the application manager apparatus 14 determines when the information in the referrer is related to a known domain. In this example, the application manager apparatus 14 includes a list of all the domains known to the application manager apparatus 14 and therefore the application manager apparatus 14 can compare the domain in the referrer information against the stored list of domain information to determine when the domain in the referrer information is known. Accordingly, when the application manager computing device determines that the domain in the referrer information is known, then the Yes branch is taken to step 350 which will be further illustrated below.

Alternatively, when the application manager apparatus 14 determines that the referrer information includes the same domain information as the host header information, then the application manger apparatus 14 can proceed to reject the requested web resource and end the exemplary method at step 355.

However, when the application manager apparatus 14 determines that the domain in the referrer information is not known, then the No branch is taken to step 345.

In step 345, the application manager apparatus 14 determines when the domain in the referrer information is a known subdomain, or a cross domain or a related external domain. In this example, a subdomain relates to domain that is part of a larger domain. Additionally, cross domain relates to a domain that enables transfer of information between two domains. Furthermore, related external domain relates to a domain that is related to a known domain, although related external domain can include other types or amounts of domains. Accordingly, when the application manager apparatus 14 determines that the domain in the referrer information is not a subdomain, cross domain or a related external domain, then the No branch is taken to the step 315 of obtaining JavaScript obfuscation challenge.

However, when the application manager apparatus 14 determines that the domain in the referrer information is a subdomain, cross domain or a related external domain, then the Yes branch is taken to step 350.

In step 350, the application manager apparatus 14 determines when there is a valid cookie for the domain in the referrer information. Additionally in this example, the application manager apparatus 14 determines when the subdomain, cross domain or related external domain includes a valid cookie by temporarily redirecting to a referenced page to obtain the cookie. By way of example only, when the received request for a web resource is for an image in b.com (referrer information in the header) which is referenced by a webpage a.com, then the application manager apparatus 14 temporarily redirects to a.com to obtain the cookie and set the obtained cookie to b.com. The technique of temporarily redirecting to a.com to obtain the cookie and set the obtained cookie to b.com is further illustrated in FIG. 5. In this example, a valid cookie relates to an encrypted cookie that was previously sent to the requesting one of the plurality of client computing devices 12(1)-12(n) responsive to a previous request to access a webpage or a resource on the webpage. Additionally, the valid cookie is also an encrypted cookie that has not expired as each encrypted cookie sent by the application manager apparatus 14 has an expiration time. By way of example only, the encrypted cookie includes information, such as the internet protocol (IP) address of the requesting one of the plurality of client computing devices 12(1)-12(n) (obtained based on previous requests), time stamp information (the time at which the request was received), an index to a client-server key and encrypted using a private key at the application manager apparatus 14, although the encrypted cookie can include other types or amounts of information and encrypted using other public-private keys. Accordingly, when the application manager apparatus 14 determines that the there is no valid cookie for the domain in the referrer information, then the No branch is taken back to step 315 of obtaining and sending the JavaScript challenge.

However, when the application manager apparatus 14 determines that the there is a valid cookie for the domain in the referrer information, then the Yes branch is taken to the step 335 of providing the requested web resource to the requesting one of the plurality of client computing devices 12(1)-12(n) and the exemplary method ends at step 355.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A non-transitory computer readable medium having stored thereon instructions for preventing D/DoS attack on a web resource comprising machine executable code which when executed by at least one processor, causes the processor to perform steps comprising:
   receive a request for a web resource from a client;
   determine when the received request for the web resource comprises referrer header information;
   determine when the referrer header information comprises a known domain and a valid cookie associated with the known domain when the received request is determined to include the referrer header information; and
   prevent a distributed denial of service attack by providing a proactive challenge to the requesting client when the referrer header information comprises the known domain.

2. The medium as set forth in claim 1 further comprising providing the requested web resource when the referrer header information is determined to include the known domain and the valid cookie associated with the known domain.

3. The medium as set forth in claim 1 further comprising determining when the referrer header information comprises a subdomain, a cross domain or, a related external domain when the referrer header information is determined not to include the known domain.

4. The medium as set forth in claim 3 further comprising:
   determining when there is the valid cookie associated with the subdomain, the cross domain or, the related external domain when the referrer header information is determined to include the subdomain, the cross domain or, the related external domain; and
   preventing the distributed denial of service attack by providing the proactive challenge to the requesting client when cookie is not determined to be valid.

5. The medium as set forth in claim 1 wherein the preventing further comprises:
   receiving a response for the proactive challenge from the client;
   determining when the received response is accurate by comparing the received response with a stored response; and
   providing access to the requested web resource when the received response is determined to be accurate.

6. An application manager apparatus, comprising one or more processors coupled to a memory and configured to be capable of executing programmed instructions comprising and stored in the memory to:
   receive a request for a web resource from a client;
   determine when the received request for the web resource comprises referrer header information;
   determine when the referrer header information comprises a known domain and a valid cookie associated with the known domain when the received request is determined to include the referrer header information; and
   prevent a distributed denial of service attack by providing a proactive challenge to the requesting client when the referrer header information comprises the known domain.

7. The device as set forth in claim 6 wherein the processors are further configured to be capable of executing one or more additional programmed instructions comprising and stored in the memory to provide the requested web resource when the referrer header information is determined to include the known domain and the valid cookie associated with the known domain.

8. The device as set forth in claim 6 wherein the processors are further configured to be capable of executing one or more additional programmed instructions comprising and stored in the memory to determine when the referrer header information comprises a subdomain, a cross domain or, a related external domain when the referrer header information is determined not to include the known domain.

9. The device as set forth in claim 8 wherein the processors are further configured to be capable of executing one or more additional programmed instructions comprising and stored in the memory to:
   determine when there is the valid cookie associated with the subdomain, the cross domain or, the related external domain when the referrer header information is determined to include the subdomain, the cross domain or, the related external domain; and
   prevent the distributed denial of service attack by providing the proactive challenge to the requesting client when cookie is not determined to be valid.

10. The device as set forth in claim 6 wherein the processors are further configured to be capable of executing one or more additional programmed instructions comprising and stored in the memory to prevent further comprises:
   receive a response for the proactive challenge from the client;
   determine when the received response is accurate by comparing the received response with a stored response; and
   provide access to the requested web resource when the received response is determined to be accurate.

11. A network traffic management system, comprising one or more traffic management apparatuses, client devices, or server devices, the network traffic management system comprising memory comprising programmed instructions stored thereon and one or more processors configured to be capable of executing the stored programmed instructions to:
   receive a request for a web resource from a client;
   determine when the received request for the web resource comprises referrer header information;
   determine when the referrer header information comprises a known domain and a valid cookie associated with the known domain when the received request is determined to include the referrer header information; and
   prevent a distributed denial of service attack by providing a proactive challenge to the requesting client when the referrer header information comprises the known domain.

12. The network traffic management system of claim 11, wherein the one or more processors are further configured to be capable of executing the programmed instructions stored in the memory to provide the requested web resource when the referrer header information is determined to include the known domain and the valid cookie associated with the known domain.

13. The network traffic management system of claim 11, wherein the one or more processors are further configured to be capable of executing the programmed instructions stored in the memory to determine when the referrer header information comprises a subdomain, a cross domain or, a related external domain when the referrer header information is determined not to include the known domain.

14. The network traffic management system of claim 11, wherein the one or more processors are further configured to be capable of executing the programmed instructions stored in the memory to:
   determine when there is the valid cookie associated with the subdomain, the cross domain or, the related external domain when the referrer header information is determined to include the subdomain, the cross domain or, the related external domain; and
   prevent the distributed denial of service attack by providing the proactive challenge to the requesting client when cookie is not determined to be valid.

15. The network traffic management system of claim 11, wherein the one or more processors are further configured to be capable of executing the programmed instructions stored in the memory to prevent further comprises:
   receive a response for the proactive challenge from the client;
   determine when the received response is accurate by comparing the received response with a stored response; and
   provide access to the requested web resource when the received response is determined to be accurate.

* * * * *